Feb. 22, 1938.   C. E. ADAMS   2,109,308
DRILL GRINDER
Filed March 3, 1936   6 Sheets-Sheet 1
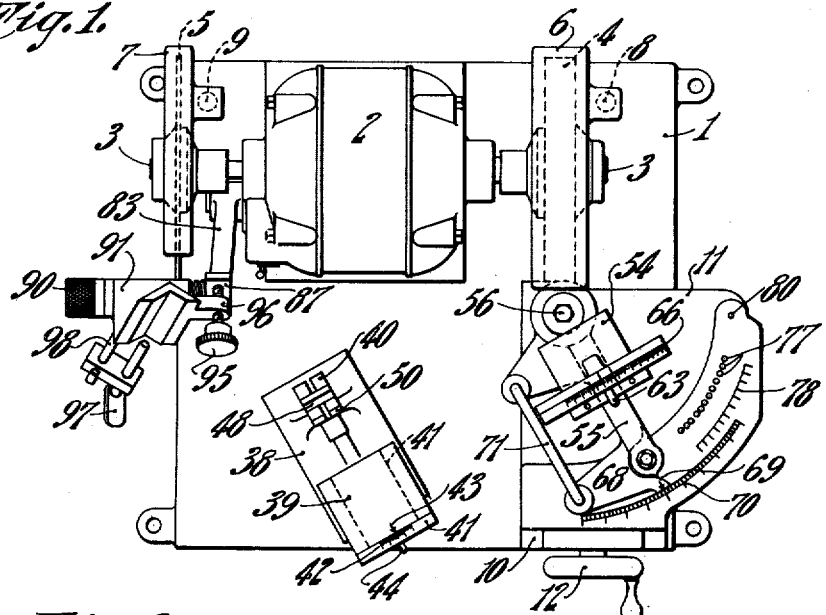
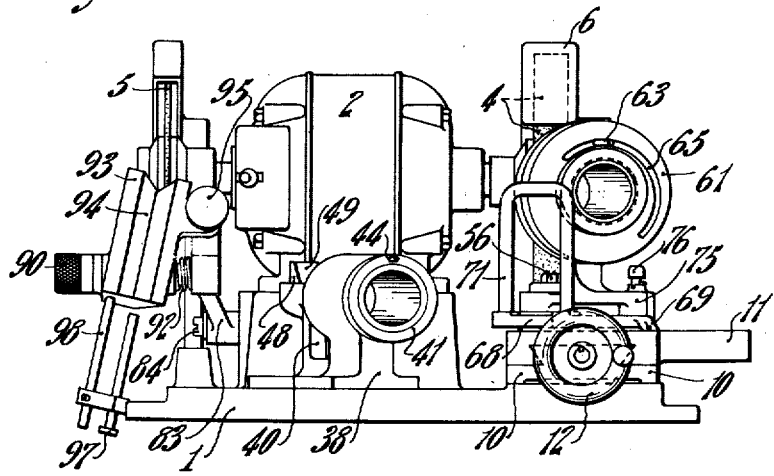
INVENTOR,
Carroll E. Adams,
BY
Harry W. Bowen,
ATTORNEY.

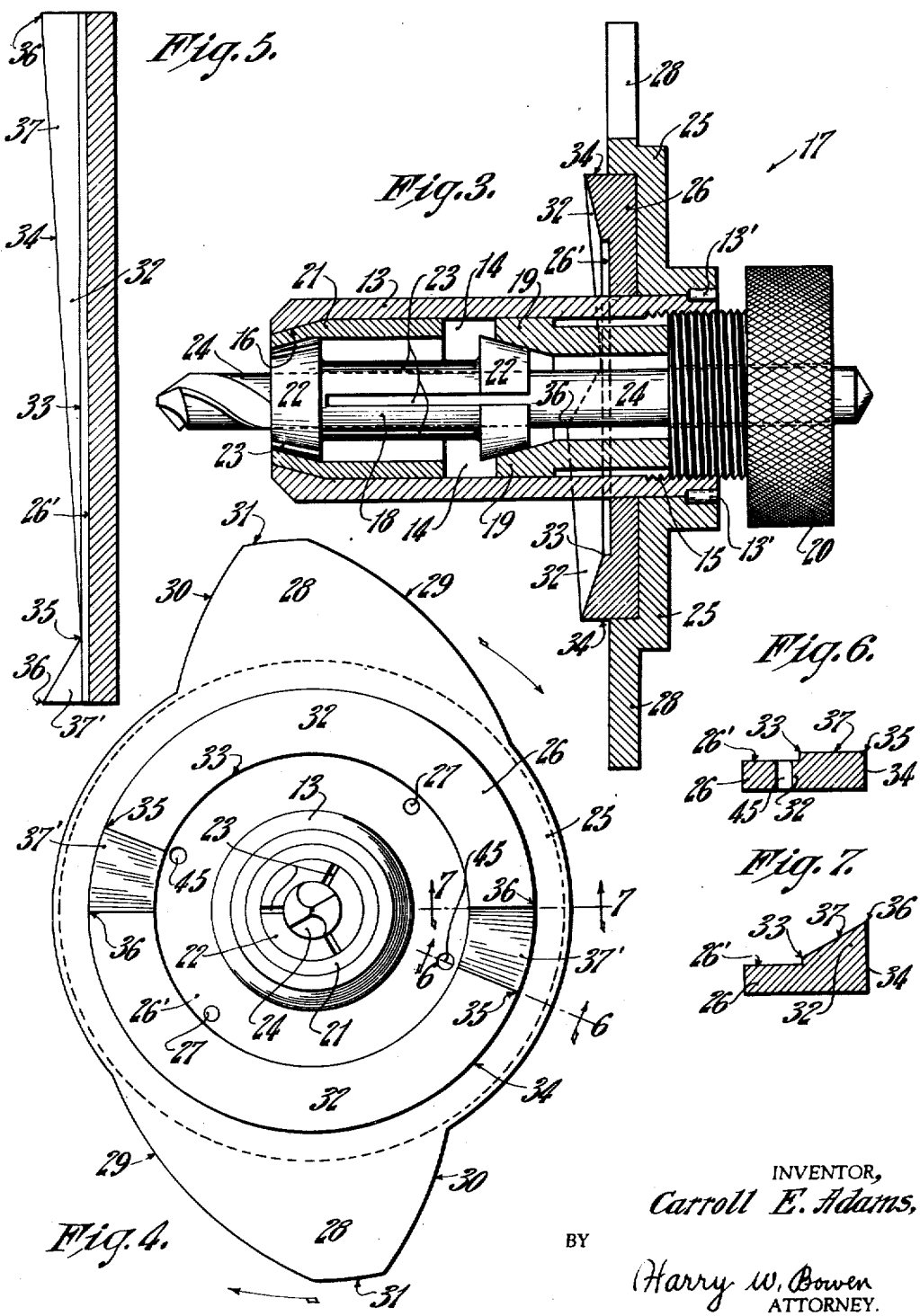

Feb. 22, 1938.   C. E. ADAMS   2,109,308
DRILL GRINDER
Filed March 3, 1936   6 Sheets-Sheet 3
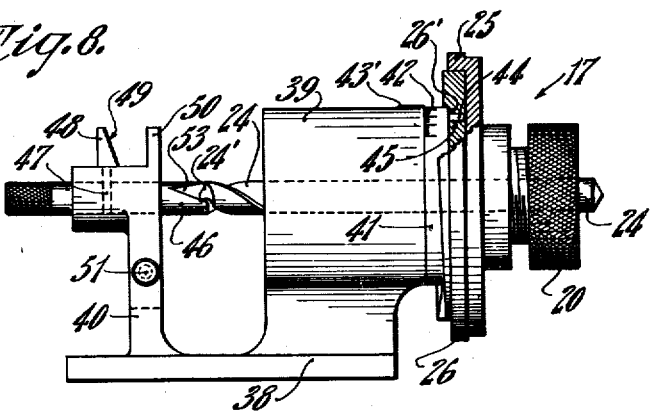
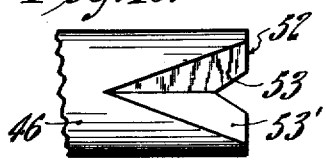
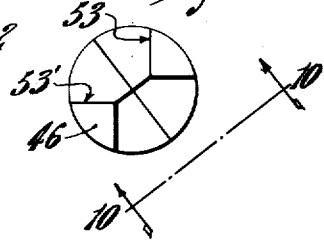
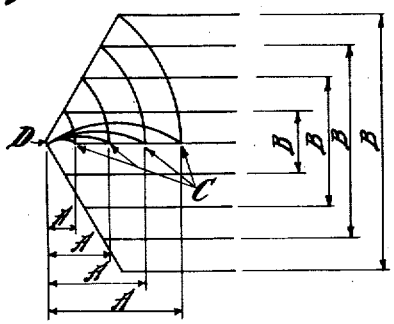
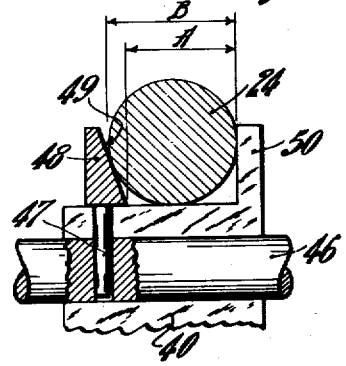
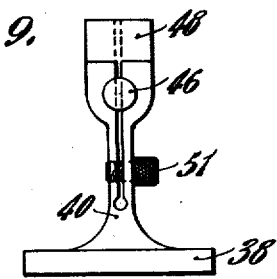
INVENTOR,
Carroll E. Adams,
BY
Harry W. Bowen
ATTORNEY.

Feb. 22, 1938.                C. E. ADAMS                2,109,308
                              DRILL GRINDER
                         Filed March 3, 1936           6 Sheets-Sheet 4
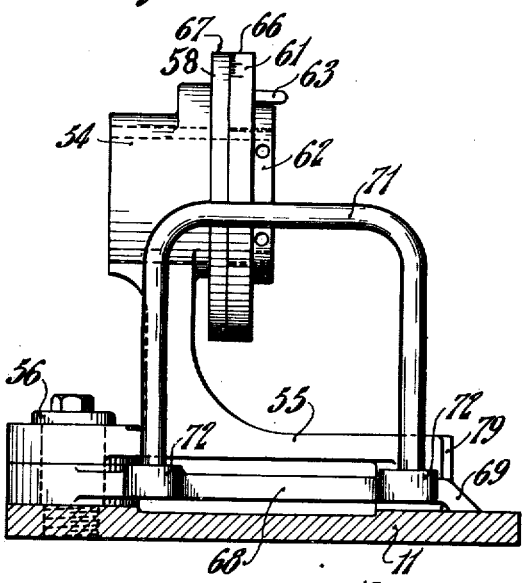
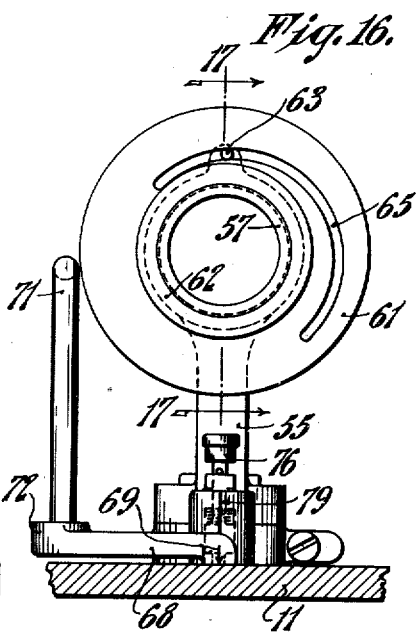
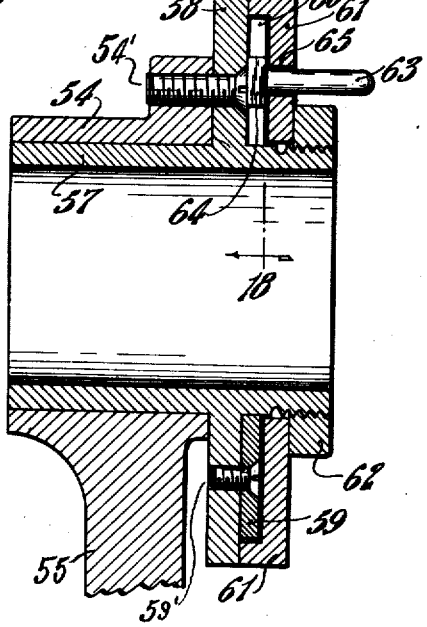
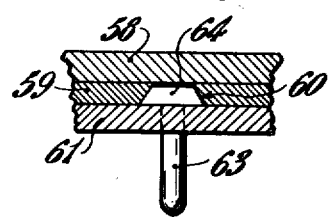
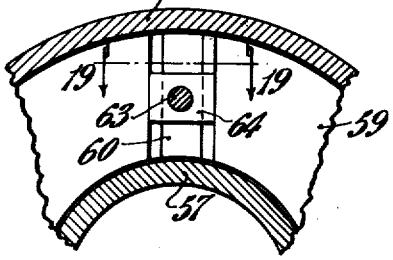
INVENTOR,
Carroll E. Adams,
BY
Harry W. Bowen
ATTORNEY.

Feb. 22, 1938. C. E. ADAMS 2,109,308
DRILL GRINDER
Filed March 3, 1936 6 Sheets-Sheet 5
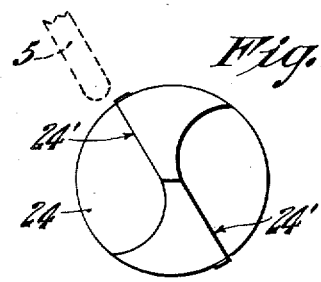
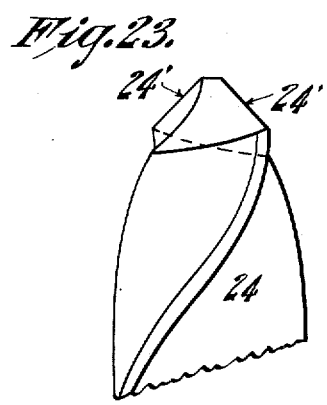
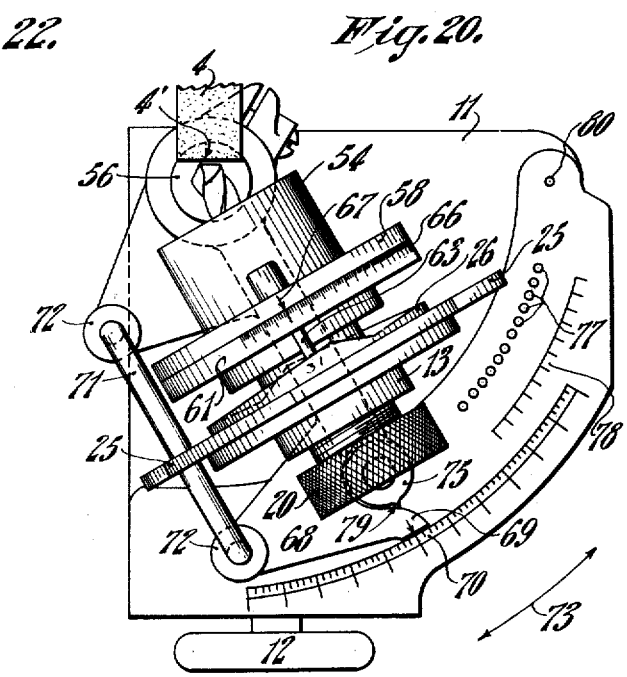
INVENTOR,
Carroll E. Adams,
BY
Harry W. Bowen
ATTORNEY.

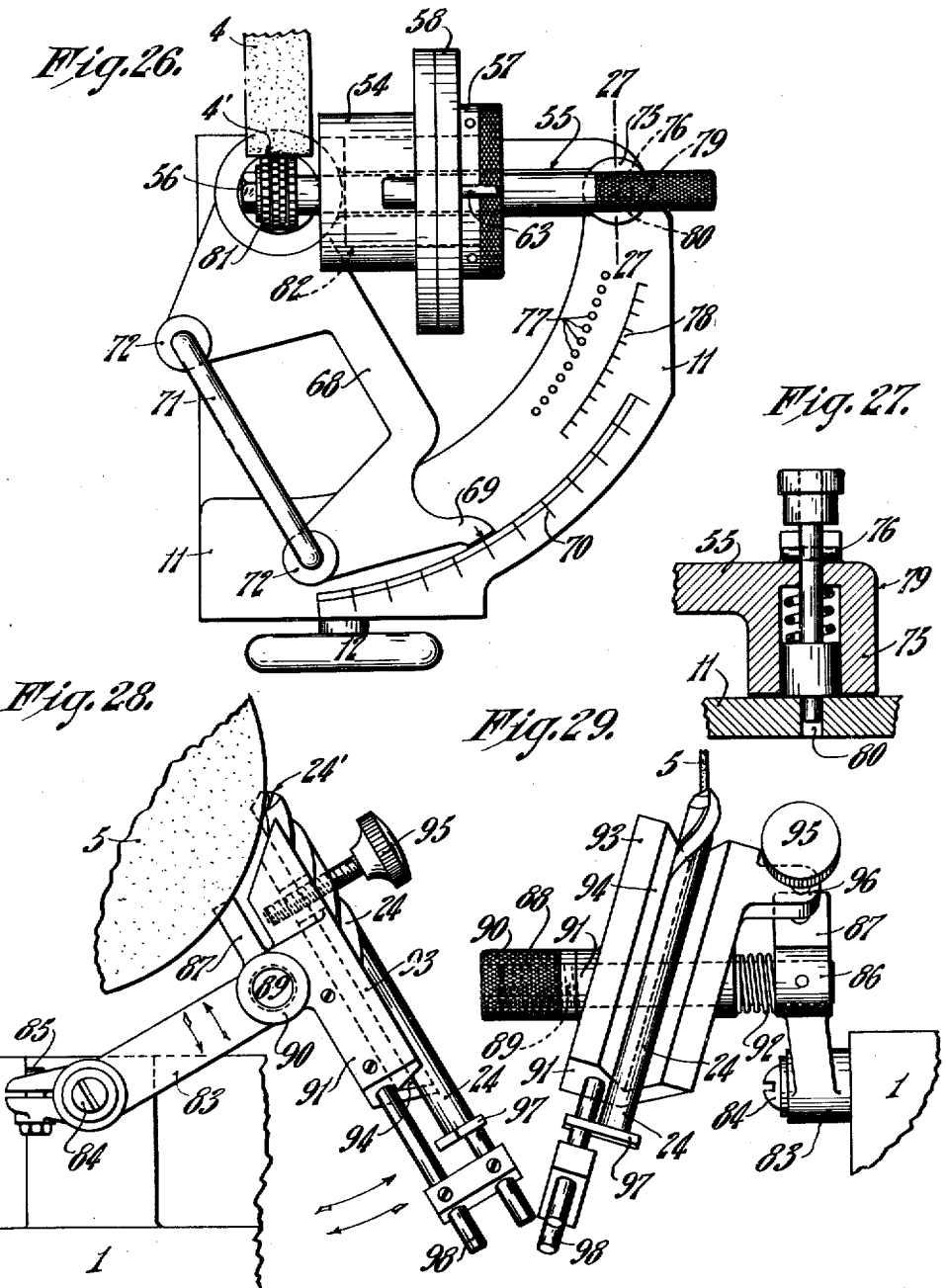

Patented Feb. 22, 1938

2,109,308

UNITED STATES PATENT OFFICE 2,109,308

DRILL GRINDER

Carroll E. Adams, Pawtucket, R. I.

Application March 3, 1936, Serial No. 66,836

9 Claims. (Cl. 51—219)

This invention relates to improvements in drill grinders.

An object of this invention is to provide, in a drill grinder, means for grinding all of the lips or faces of the drill point at a single setting of the drill. It is customary, in drill ginders now used in the art, to grind one lip of the drill, then, remove the drill from its holding means, turn it, (as 180 degrees for a drill having two lips), and relocate it in the holding means for grinding the next, or second lip. This operation tends to inaccuracy in setting of the drill, resulting in unequally ground drill faces. By completely grinding all of the faces of the drill point at one setting, an absolutely symmetrical drill point, having each lip identical in all its phases, is mandatory.

A second object of the invention is to provide, in a drill grinding device, means for grinding identical relief angles and for all diameters of drills.

A third object of this invention is to provide, in a drill grinding device, means for grinding a chamfered face or surface interposed between the lip face and the land face of the drill, the chamfered face being ground to the same relief angle, or spiral, as the lip face. Drills, having a straight lip face, characterized by a straight line extending from the point of the drill to the land, wear most rapidly at the intersection of the lip face with the land. By chamfering this intersection, thus interposing a secondary lip face between the primary lip face and the land, the intersecting angles of the faces and the secondary face and the land is materially increased, and the useful life of the drill is materially lengthened.

A further object of this invention is to provide, in a drill-grinding device, means for thinning the web of the drill and grinding the correct rake, whereby both sides of the web of the drill will be exactly alike.

A still further object of this invention is to provide, in a drill-grinding device incorporating the above described features, sufficient adjustability in the various controlling elements to permit as wide a range as is practical in the choice of point angle and other characteristics of the drill point, so that the drill grinder may be adjusted to grind drill points for any and all conditions and customs.

Another object of this invention is to provide means, in a drill-grinding device, for controlling the dressing of the grinding wheel to present the face surface of the wheel at exactly the correct angle to the work to be ground.

These, and other objects and advantages of this invention, will be more completely disclosed and described in the following specification, the accompanying drawings, and the amended claims.

Broadly, the invention comprises a base, a grinding unit including grinding wheels and motor mounted on the base, a feed table slidably supported on the base, a drill holder, means for locating a drill in the holder in a definite relation thereto, a bearing for the holder pivotally secured on the table, adjustable stop means on the feed table, a cam on the drill holder engaged by the stop means for moving the bearing and holder about the pivot of the bearing, co-operating means between the holder and the bearing for moving the holder longitudinally of its axis, co-operating means between the bearing and the table for locating the bearing at predetermined positions on the table, adjustable means for holding the drill in proper relation to a grinding wheel for grinding or thinning the web of the drill, and means for moving the table toward and away from a grinding wheel.

A preferred embodiment of this invention is illustrated in the accompanying drawings, in which:—

Fig. 1 is a plan view of the grinding machine.

Fig. 2 is a front, elevational view of the same.

Fig. 3 is a longitudinal, sectional view of the drill holder, or quill.

Fig. 4 is an elevational view of the cams mounted on the quill.

Fig. 5 is a developed view of one-half of the thrust cam.

Fig. 6 is a partial, sectional view through the thrust cam, taken on the line 6—6 of Fig. 4.

Fig. 7 is a view, similar to Fig. 6, taken on the line 7—7 of Fig. 4 of the thrust cam.

Fig. 8 is a side, elevational view of the drill locater, with the quill inserted therein.

Fig. 9 is an end view of the adjustable drill point locater.

Fig. 10 is a partial, side, elevational view of the drill point locater, illustrating the method of forming the same.

Fig. 11 is an end view of the drill point locater.

Fig. 12 is a side, elevational view of the drill point locater, as it is positioned in the drill locater.

Fig. 13 is a graphical illustration of the relation of the drill point and cutting angle to the drill diameter.

Fig. 14 is a side view, partially in section, illustrating the method of co-relating the drill diameter and location of the drill point locater.

Fig. 15 is a side, elevational view of the quill bearing and stop device.

Fig. 16 is an end, elevational view of the same.

Fig. 17 is a partial, sectional view of the quill bearing.

Fig. 18 is a partial, sectional view on the line 18—18 of Fig. 17.

Fig. 19 is a partial, sectional view, taken on the line 19—19 of Fig. 18.

Fig. 20 is a partial, plan view, showing the bearing, stop, and quill in position for grinding the drill point.

Fig. 21 is a view similar to Fig. 20, showing the various parts in position for grinding the secondary faces on the drill point.

Fig. 22 is a plan, or end view, of a typical drill point.

Fig. 23 is a side, elevational view of a typical drill point.

Fig. 24 is a side view of a drill point, before grinding the secondary faces.

Fig. 25 is a side view of the same drill point, after grinding the secondary faces.

Fig. 26 is a view similar to Fig. 20, showing the bearing in position for dressing the grinding wheel.

Fig. 27 is a partial, sectional view on the line 27—27 of Fig. 26.

Fig. 28 is a side, elevational view of the drill support for thinning the web of the drill, and Fig. 29 is a front, elevational view of the same.

Referring now to the drawings in detail, in which like numerals refer to like parts throughout:—

A base member 1 has secured thereon a motor 2, having a shaft 3 on which is secured, in the usual manner, grinding wheels 4 and 5. Guards 6 and 7 are supported over the wheels 4 and 5, respectively, on posts 8 and 9, which are secured in the base 1. A plate 10, secured on the base 1, slidably supports a feed table 11, and this table may be moved toward and away from the axis of the grinding wheel 4, on the plate 10, by means of a screw and handwheel 12. A quill holder bearing and stop device are pivotally secured on the table 11, and a drill-locating device is secured on the base 1. These devices will be described in detail later, in order of their use. A drill holder, or quill 17, (see Fig. 3), is provided in co-operation with the grinding machine, and is illustrated in detail in Figs. 3 to 7, inclusive. A sleeve member 13 is provided with a bore 14 terminating at one end in a threaded portion 15 and at the opposite end in a tapered portion 16. A drill chuck 18 may be secured in the sleeve 13 between the inclined end 16 and a forcing sleeve 19, which is slidably supported in the bore 14 and actuated by means of a screw 20, engaged in the threaded portion 15 of the sleeve 13. Variable sizes of drill chucks may be used in the sleeve 13 by varying the inside diameter of an adapter sleeve 21, inserted in the bore 14 between the drill chuck 18 and sleeve member 13. The chuck 18 is formed with opposed, enlarged, tapering end sections 22 and a plurality of slots 23, which extend alternately from opposite faces of the sections 22. The slots 23 provide spring portions in the chuck 18 for gripping and releasing a drill 24. One of the tapered end portions 22 is located in the adapter sleeve 21 and the opposite tapered end portion is located in the end of the forcing sleeve 19. Rotation of the screw 20 into the sleeve 13 will advance the forcing sleeve 19 onto one of the inclined portions 22 of the chuck 18, thereby contracting the chuck 18 by engagement of the inclined, or tapered surfaces, causing the chuck to grip the drill 24 with an equal force at each of the ends 22. Reversal of the movement of the screw 20 will release the pressure on the chuck 18 and permit the same to expand, thereby releasing the drill 24.

Two cams are secured on the sleeve member 13; a "throw" cam 25 by the key 13', for moving the drill point in a circular, or angular movement, about the pivot point 56 on the feed table 11, and a "thrust" cam 26 having a press fit in the cam 25 for moving the drill point longitudinally of its axis. These cams bear a definite relation to each other and to the drill point, and move as a unit, being secured together by dowels 27. The circular or angular throw cam 25 for the drill is provided with operating lobes or flanges 28, having advance cam surfaces 29 and return cam surfaces 30, with a dwell surface 31 between them. The thrust cam 26 is provided with a circumferential cam flange 32, having an inner edge 33 which lies in the same plane throughout its circumference, as shown in Figs. 3, 5, 6, and 7, and an outer edge 34 which advances radially outward from a point 35 in the same plane with the inner edge 33 to a peak point 36, thence in a sharp return to the point 35. This construction results in a cam surface 37 which progresses in pitch from a level at 35 to its extreme pitch at 36, as indicated in the developed view in Fig 5. Each of the cams 25 and 26 is provided with a number of cam surfaces equal to the number of lips on the drill to be ground. The purpose and operation of these cams will be explained later.

As the throw cam 25 and thrust cam 26 control, as a unit, the shape and grinding of the drill point, and must bear a definite relation thereto, a drill locator 38, (see Fig. 8), is provided and secured on the base 1, (see Fig. 1), for locating, or positioning, the drill point in the quill, or drill holder 17. The member 38 is formed with a bearing sleeve 39 in which the quill 17 may be slidably supported, and a drill point locating arm 40 spaced from the sleeve 39. A collar 41, provided with gauge or graduation marks 42, which co-operates with an index mark 43' on the sleeve 39, (see Fig. 8), is rotatably supported in the sleeve 39, as shown in Fig. 1, and is provided with a pin or stud 44 which registers with an opening 45 in line with the point 35, in the thrust cam 26, for definitely locating the cams 25 and 26, circumferentially, relative to a drill point locator 46, shown in Figs. 9, 10, 11, 12 and 14, which is slidably guided in the standard or arm 40. The drill point locator member 46 is prevented from rotary movement in the arm 40 by a pin 47 on a jaw 48, having a tapered face 49 opposed to a fixed jaw 50 on the arm 40. The member 46, carrying the tapered face jaw 48 is slidably secured in the arm 40, and may be clamped in position, when set for a certain diameter of drill by means of a set screw 51.

In order to grind drill points with identical relief angles and synonymous relief surfaces, it has been necessary to provide means for setting the drill point, in relation to the pivot point of the angular or throw cam 25, so that each of the distances A, (see Fig. 13) is a definite proportion of the corresponding diameters B of the drill to be ground, with each of the points C over the pivot point 56 for the cam 25. The distance, therefore, of the drill point D from the cam 25 will vary directly in proportion to the diameter of the drill. This distance is determined by laying the drill to be ground between the surface 49 of the jaw 48 and the jaw 50, as indicated in Fig. 14. This operation locates the end 52 of the drill point locator 46 with relation to the throw cam 25, and thrust cam 26. The cutting edge 24' of the drill 24 is located, circumferentially, in proper relation to the cams 25 and 26, by engagement against a plane, or straight surface 53, cut in the end of the locator 46. To set a drill properly in the quill sleeve 13, the drill is first placed between the jaws 48 and 50 to locate the point of the locator member 46, after which the set screw 51 may be tightened, and any number of drills having the same diameter will be identically located in the quill sleeve 13. After locating the point of the member 46, the drill is inserted in the chuck 18, with sufficient pressure exerted by the screw 20 to hold the drill lightly. The quill sleeve 13 is then inserted in the sleeve 39 of the locator 38 with the recessed surface 26' of the cam 26 abutting the graduated collar 41 and the pin 44, engaged in an opening 45 in the drill thrust cam 26. With the quill thus assembled in the locator 38, the drill is moved longitudinally and circumferentially, until the drill point impinges against the drill point locator 46 with the cutting edge 24' against the flat plane surface 53, as indicated in Fig. 8. The screw 20 is then tightened to firmly hold the drill in the chuck 18.

With the drill 24 firmly held in the quill sleeve 13, in proper relation to the cams 25 and 26, the quill 13 is then removed from the locator 38 and slidably inserted in a bearing sleeve 54 on an arm 55 which is pivotally located on a stud 56, secured in the table 11, (see Figs. 15, 16, and 17). The stud 56 is the pivot point previously referred to in this specification. A sleeve member 57, fixedly secured in the bearing sleeve 54 with the screw 54', is formed with a flanged portion 58, on which is secured a disc 59 by the screw 59', provided with a V-slot 60. A flanged disc, or cam member 61, is rotatably supported on the disc 59 and held in adjusted position by means of a nut 62, threadably secured on the sleeve 57. A pin, or stud 63, having a T head 64, which is slidably guided in the slot 60, projects through a cam slot 65 formed in the member 61. Rotation of the member 61 will move the stud 63 radially, thus varying its distance from the axis of the sleeve 57 and quill 13. The radial position of the stud 63 is read by co-operation of an index gauge 66 on the rotatable member 61 with an index mark 67 on the flange 58. When the quill 13 is inserted in the sleeve 57 and revolved by the part 20, engagement of the stud 63 on the cam surface 37 of the thrust cam 26 results in longitudinal movement of the quill 13, relative to the sleeve 57 and grinding wheel 4. The amount of this movement is determined by the radial position of the stud 63 on the cam surface 37.

A second arm member 68 is also pivotally secured on the table 11 by the pivot stud 56, and is provided with an indicator finger portion 69, which corresponds with the normal position of the axis of the bearing member 54 and quill 13. This indicator finger 69 co-operates with an index dial 70 on the table 11, (see Figs. 20 and 21), to control the normal axis of the quill 13 and thereby determine the included point angle which shall be ground on the drill point. A stop bar 71, secured in bosses 72 formed on the member 68, is engaged by the cam 25 and by this engagement moves the quill 13 through an arc, indicated at 73, in Fig. 20, as the quill 13 is revolved in the bearing 54. Thus, the angular relation of the axis of the quill 13 with the grinding wheel 4 is controlled by engagement of the cam 25 against the stop bar 71, and the stop bar 71 is adjustably located according to the desired reading on the index 70 on the table 11.

In operation, as the quill 13 is revolved within the sleeve 57, with the necessary forward pressure exerted against the rear of the quill, co-operation of the bar 71 and cam 25 with the stud 63 and cam 26, will present the drill point to the grinding wheel in the manner required to grind the point to the required characteristics, and with the predetermined relief angle and included point angle. As the cam 25 throws the axis of the quill 13 to its outermost travel, thereby completing the grinding of one lip of the drill, the quill 13 is held in this extreme position by the dwell surface 31 on the cam 25, while action of the pin 63 against the quick return surface 37' of the cam 26 will pull the drill point away from the grinding wheel to provide a clearance necessary to prevent grinding of the point of the drill while approaching the second lip, or cutting edge. As the second cutting edge is presented to the wheel, the co-operation of the cams 25 and 26 and their related parts again feed the quill forwardly and radially, grinding a second relief surface identically the same as the first. Thus, all the cutting lips of the drill point are ground at a single setting of the drill and without removing the quill 13 from the bearing sleeve 54.

After the relief surfaces $24^2$ have been ground on the drill point as explained above, a secondary relief surface $24^3$ may be ground on the drill point, to provide a chamfered effect to the drill, as indicated in Fig. 25, in order to reduce wear on the drill point and prolong its useful life. This secondary surface $24^3$ is ground with the quill and bearing 54 in a position similar to that indicated in Fig. 21. A boss 75, formed on the arm 55, is provided with a spring pin 76, (see Fig. 27), and the table 11 is provided with a plurality of holes 77 having a common radius from the pivot 56, in any one of which the pin 76 may be engaged. A gauge 78, co-operating with an indicating ridge 79, formed on the boss 75, directs the proper hole in which to set the pin 76 for the angle desired. With the arm 55 fixed in position by the pin 76, rotary or angular movement of the quill 13, co-operating with engagement of the cam 26 and pin 63, will grind a secondary relief surface $24^3$ having exactly the same relief angle, or spiral, as the surface $24^2$, as indicated in Fig. 25. Preferably, the angle of intersection of the two relief surfaces and the angle of intersection of the secondary relief surface and the surface of the land should be equal, as indicated at E in Fig. 25, but any angle may be formed by adjustment of the arm 55 by means of the pin 76. Also, the relative lengths F and G of the relief surfaces may be controlled and varied by the feed of the table 11 toward the grinding wheel 4.

If the finished drill point is to correspond in its various characteristics to the settings provided on the feed table 11, it is imperative that the plane of the face 4' of the grinding wheel 4 should be at right angles to the direction of feed of the table 11.

The wheel 4 is dressed to produce this condition in the manner indicated in Fig. 26. A hole 80, in the feed table 11, similar to the holes 77, is located directly opposite the pivot point 56, so that when the bearing arm 55 is swung until the pin 76 is located in the hole 80, the axis of the bearing sleeve 54 will be at right angles to the feed of the table 11. With the bearing sleeve 54 set in this position, a dressing tool 81 is slidably supported in a sleeve 82, which is removably supported in the sleeve 57, and the tool 81 may be moved back and forth across the grinding face of the grinding wheel, as the feed table 11 is fed toward the grinding wheel, until the wheel is properly dressed.

A device for grinding the inside of the lands of the drill for thinning the web, after the point of the drill has been completed on the wheel 4, is illustrated in Figs. 1, 2, 28 and 29. A supporting arm 83 is pivotally supported on a stud 84 secured in the base 1, and may be secured in an adjusted position on the stud 84 by means of a clamping bolt 85. The outer end of the arm 83 is provided with a hub 86, having an upwardly extending stop boss 87. A shaft 88 is fixedly secured in the hub 86, and is threaded at its outer end 89 for receiving an adjusting nut 90. A drill rest 91 is revolvably supported on the shaft 88 and held against the nut 90, in spaced relation with the hub 86, by a compression spring 92. The drill rest 91 is formed with a bed portion 93, provided with a V-shaped groove 94 for receiving a drill 24, and the bed 93 and groove 94 are set at an angle to the grinding wheel 5 which, when the drill is ground on the wheel 5, will form the proper front rake for the cutting edge of the drill. A limit, or stop screw 95, is threadably secured in a boss 96 extending outwardly from the side of the bed 93, and provides means for limiting the movement of the drill rest 91 around the shaft 88, thereby limiting the movement of the point 24' of the drill 24 toward the wheel 5. A foot, or stop member 97, adjustably secured on a rod 98 projecting from the bed 93, provides a support for the end of the drill 24, and may be set to accommodate any desired length of the drill. The depth of the cut, from the perimeter of the drill toward its axis, is controlled by co-operation of the boss 87 and limit screw 95, and the length of the cut, longitudinally of the axis of the drill, is determined by adjustment of the arm 83 on the pivot stud 84. Lateral movement of the bed 91, to present the drill point in proper relation to the wheel, is governed by co-operation of the take-up nut 90 and spring 92. Once set, this device will grind a front rake and thin each side of the web of a drill point exactly alike, and will produce identical characteristics on each lip of all drills having the same diameter and length.

The machine may be adjusted to grind any desired point angle and any desired relief angle on a drill point, and when once set, or adjusted, will grind each lip of every drill having the same diameter with identical characteristics, in all respects. It will be readily understood by those skilled in the art, that, whereas, the drawings illustrate the various elements of the grinding machine, as adapted for the common type of drill having two lips, drills having from one to any number of lips may be ground, simply by making the throw and thrust cams with a number of operating surfaces corresponding to the number of lips on the drills to be ground. Also, by reversing the circumferential movement of the quill and the circumferential arrangement of the operating surfaces of the throw and thrust cams, and revolving the drill point locator through 90 degrees, so that the plane or straight surface 53' is vertical, lefthand drills may be ground on the same machine.

What I claim is:—

1. In combination, in a drill grinding apparatus, a base, a grinding wheel mounted on the base, means for operating the grinding wheel, a clutch for holding a drill, a bearing sleeve in which said clutch is slidably and rotatably supported, means for moving said clutch longitudinally in said bearing sleeve when said clutch is rotated comprising a radially adjustable stud on said bearing sleeve and a cam on said clutch cooperating with said stud, said cam being provided with a plurality of arcuate cam faces, each of said cam faces having an inner annular edge in a plane perpendicular to the axis of said clutch and an outer annular edge in a plane at an angle to the plane of the inner edge, as described.

2. In combination, in a drill grinding apparatus, a base, a grinding element thereon, means for operating said grinding element, a clutch for holding a drill, a bearing pivotally secured on said base in which said clutch is slidably and rotatably supported, means for adjustably controlling longitudinal movement of said clutch comprising a cam secured on said clutch and provided with radially warped cam faces and a radially adjustable stud on said bearing engaged by said cam faces, and means for imparting an intermittent oscillatory movement to said bearing comprising a second cam secured on said clutch and provided with advance and return surfaces spaced by a dwell surface and a bar engaged by said last-named cam surfaces, said bar being pivotally and adjustably secured on said base.

3. In a drill grinding device, a base, a plate movable thereon, a sleeve, means for retaining a drill to be ground in said sleeve, two cam members secured on said sleeve, a bearing pivotally secured on said plate in which said sleeve may be slidably and rotatably supported, a grinding element, adjustable means for engaging one of said cam members for controlling oscillatory movement of said bearing on its pivot, adjustable means engaging the other of said cam members for controlling longitudinal movement of said sleeve in said bearing, and cooperating elements on said cams for holding said bearing stationary while said sleeve is moved longitudinally away from said grinding element.

4. In a drill grinding device, a base, a grinding element, a plate part movable on said base in a direction perpendicular to the face of said grinding element, a sleeve member, means for retaining a drill to be ground in the sleeve member, two cam members secured on the sleeve member and to each other, a pivoted bearing sleeve in which the drill-retaining sleeve is located, one of the cam members operating to move the drill axially towards the grinding element an adjustable buttress on said plate the other cam member simultaneously operating in cooperation with said buttress to oscillate the drill about the pivot point of the bearing for imparting relief surfaces to the lips of the drill, and means for positioning said bearing sleeve on said plate for grinding secondary or chamfered spiral faces between the faces of the ground lips and the faces of the lands.

5. In a drill grinding device, a base member, a plate part movable thereon, a sleeve member, means for retaining a drill to be ground in the sleeve member, two cam members secured to the sleeve member and to each other, a pivoted bearing sleeve in which the drill-retaining sleeve is located, a grinding element, a stud on said sleeve member cooperating with one of the cam members to move the drill axially towards the grinding element, an adjustable buttress pivoted on the same axis with said bearing sleeve and cooperating with the other cam member to simultaneously oscillate the drill about the pivot point of the bearing for imparting relief surfaces to the lips of the drill, means for latching the sleeve-bearing member to the plate part on the base, in any one of a plurality of positions for varying the chamfered angle of the drill being ground.

6. In a drill grinding apparatus, a base, a grinding wheel, means for operating said wheel, a pivot on said base, an arm connected to said pivot, a bearing sleeve on said arm, a drill holder slidably and rotatably supported in said bearing sleeve, a bar connected to said pivot, means for adjustably positioning said bar, a cam on said drill holder having cam lobes engageable on said bar, a stud on said bearing sleeve, a second cam on said drill holder having cam faces engageable on said stud, means for freeing a drill in said drill holder from said grinding wheel after one lip of the drill has been ground and before the next lip is ground comprising quick return faces on said second cam cooperating with dwell surfaces on said first-named cam, whereby said bearing sleeve is held stationary while said drill holder is moved longitudinally away from said grinding wheel, as described.

7. In a drill grinding apparatus, a base, a grinding wheel mounted on said base, a table slidably secured on said base for movement in a direction perpendicular to the face of said grinding wheel, a bearing sleeve pivotally secured on said table, said table being provided with a plurality of openings, latch means on said bearing sleeve cooperating with said openings for adjustably positioning the axis of said bearing sleeve relative to the face of said grinding wheel, one of said openings cooperating with said latch means to position the axis of said bearing parallel to the face of said grinding wheel.

8. In combination, in a drill-grinding machine, a grinding wheel, a table member having graduation marks thereon, an arm member pivotally connected to the table member and having an indicating finger portion which co-operates with the graduation marks on the table member, a quill holder for the drill, the axis of which corresponds with the indicating finger, a stop bar pivotally connected on said table member, a cam member carried by the drill holder engaging the stop bar when the drill holder is rotated for moving the pivotally connected arm, and means for automatically advancing the drill towards the grinding wheel when the drill holder is rotated, whereby the drill point is ground with a predetermined relief angle and included point angle, as described.

9. In a drill-grinding machine, a grinding wheel, a fixed table member, having index graduations therein, an arm member pivotally connected to the table, a bearing sleeve on the arm, a second sleeve secured to the bearing sleeve and formed with a flange portion, a disc secured to the flange portion and having a slot therein, a member having a cam slot rotatably supported on the disc, means for adjustably securing the rotatable member with a cam slot to the disc, a pin slidably guided in the slot of the disc and located in the cam slot of the rotatable disc, a drill holder rotatably supported in the second sleeve of the bearing sleeve, index means on the rotatable member having the cam slot for indicating the radial position of the pin relative to the axis of the bearing and second sleeve, a holder for the drill, two cam members secured to the drill holder, one engageable by said pin, located in the cam slot, a second arm pivotally connected to the fixed plate and on the same pivot as the first-mentioned arm, and having a portion that registers with the index graduations of the fixed table, a stop bar on the second arm with which the other cam on the holder of the drill engages for moving the drill laterally, means for rotating the drill holder in its sleeve, the construction and arrangement being such that the included point angle at which the drill will be ground is determined and the angular relation of the axis of the drill is controlled which produces the relief angle, as described.

CARROLL E. ADAMS.